Forrester & Luddington,
Lift Pump.
No. 3,888.
Reissued Mar. 22. 1870.
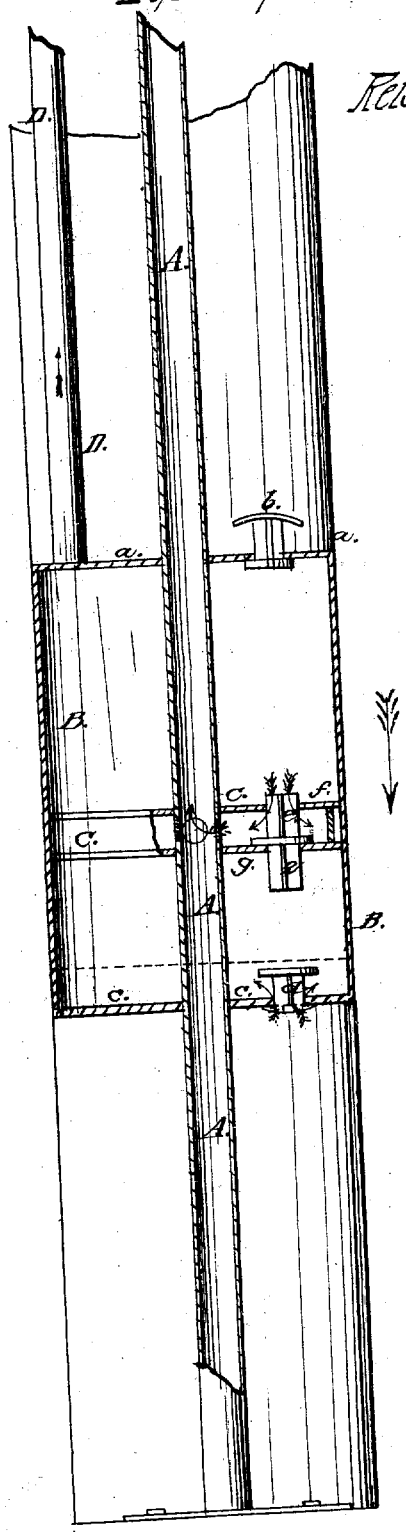
Witnessesx
Wm. A. Morgan
Ph. C. Dieterich
Inventors:
I. N. Forrester
&
J. H. Luddington.
Per. Munn & Co.
Attys.
N. PETERS, PHOTO-LITHOGRAPHER, WASHINGTON, D. C.

United States Patent Office.

THE FORRESTER MANUFACTURING COMPANY, OF BRIDGEPORT, CONNECTICUT, ASSIGNEE, BY MESNE ASSIGNMENTS, OF I. N. FORRESTER AND JAMES H. LUDDINGTON.

*Letters Patent No.* 85,577 *dated January* 5, 1869; *reissue No.* 3,888, *dated March* 22, 1870.

IMPROVEMENT IN PUMPS.

The Schedule referred to in these Letters Patent and making part of the same.

*To all whom it may concern:*

Be it known that ISAAC N. FORRESTER and JAMES H. LUDDINGTON, of Bridgeport, in the county of Fairfield and State of Connecticut, invented a new and improved Pump; and we do hereby declare the following, when taken in connection with the accompanying drawing and letters of reference marked thereon, to be a full, clear, and exact description of the same, and which said drawing constitutes part of this specification, and represents a vertical central section of the improved pump.

This invention relates to a pump of that class in which the pump-cylinder is made movable upon a stationary piston, and the object is to make the central discharge-tube fixed and stationary, so as to support the pump-cylinder without other appliances within the well.

The object of the invention is also to produce a convenient valve arrangement, which will allow the apparatus to be worked with but little friction.

The invention consists in extending the central discharge-tube through the pump-cylinder to the bottom of the well, and there secured so as to support itself and the cylinder without the intervention of other appliances.

The piston and cylinders are provided with a series of valves, by means of which the influx of water within the pump is regulated, so that a continuous stream will be produced.

A, in the drawing, represents a metal tube, with a closed lower end, standing on the bottom of the well, and is secured at the bottom of the well either by driving the tube into the earth, or by bolting to the rock, or any convenient means whereby the tube may be permanently fixed at the bottom of the well.

This tube forms the guide of the pump-cylinder B, which is fitted around it, and supports also the hollow piston C with which it communicates, the said piston being fixed to or forming a part of the tube.

The tube is perforated within the piston, as shown, so that the water can readily pass from the piston into the tube.

The piston fits well against the side of the cylinder, which is suspended from suitable levers, or other pumping mechanism, by means of a rod, D, and so as to be freely moved vertically up and down on the tube, the tube serving both as a support and guide.

In the upper head *a* of the cylinder is fitted a valve, *b*, and in the lower head *c* is arranged a valve, *d*.

The heads of the hollow piston are also perforated to permit motion to a double-acting valve, *e*, which is arranged within the said piston as shown.

When the cylinder is moved downward the head *a* will be moved toward the piston, and its valve *b* will consequently be closed, while the valve *e* will close the aperture of the lower head *g* of the piston, while that of the upper piston-head *f* will remain open.

The fluid contained in the upper compartment of the cylinder will thus, during the downward motion of the latter, be forced into the piston, and thence into the pipe A, as indicated in the drawing. The lower compartment of the cylinder will, at the same time, be filled with fresh water, the valve *d* being opened as shown.

When the motion of the cylinder is reversed, that of the water will also be, as then the valve *b* is opened and *d* closed, while *e* will close against the upper piston-head *f*. The water will then be forced into the piston from the lower compartment of the cylinder, while the upper compartment of the same will be refilled.

We claim as the invention of the said ISAAC N. FORRESTER and JAMES H. LUDDINGTON—

1. The arrangement of a pump-cylinder, so as to be moved vertically upon a fixed tube, the said tube extending through the cylinder and secured at the bottom of the well, so as to serve both as a support or guide for the cylinder, and as a discharge-tube, and the said tube having fitted thereon a fixed piston within the cylinder, so that the movement of the cylinder up and down causes a flow of water up through the central supporting-tube, substantially as described.

2. In combination with the subject-matter of the first clause of claim, the arrangement of the valves *b* and *d* in the cylinder, combined with the double-acting valve *e* in the piston, all constructed and operating substantially as shown and described.

FORRESTER MANUFACTURING CO.
By SAMUEL WILMOT,
*President and Representative duly authorized.*

Witnesses:
JOHN STEVENS,
W. A. PARROTT.